(12) United States Patent
Tonn et al.

(10) Patent No.: US 7,649,283 B2
(45) Date of Patent: Jan. 19, 2010

(54) INDUCTIVE COUPLING METHOD FOR REMOTE POWERING OF SENSORS

(75) Inventors: David A. Tonn, Charlestown, RI (US); Paul Medeiros, Middleboro, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 272 days.

(21) Appl. No.: 11/772,864

(22) Filed: Jul. 3, 2007

(65) Prior Publication Data

US 2009/0008994 A1 Jan. 8, 2009

(51) Int. Cl.
*H01F 38/14* (2006.01)
(52) U.S. Cl. .................... 307/104; 324/207.13
(58) Field of Classification Search ............... 307/104; 324/207.13
See application file for complete search history.

(56) References Cited

U.S. PATENT DOCUMENTS

| 5,008,664 A | 4/1991 | More et al. |
| 5,457,988 A | 10/1995 | Delatorre |
| 5,729,134 A | 3/1998 | Lavan, Jr. et al. |
| 6,257,077 B1 * | 7/2001 | Patterson ............... 73/865.9 |
| 6,459,383 B1 | 10/2002 | Delatorre |
| 6,535,133 B2 | 3/2003 | Gohara |
| 6,625,084 B1 | 9/2003 | Payton |
| 6,644,403 B2 | 11/2003 | Pichery et al. |
| 6,691,779 B1 * | 2/2004 | Sezginer et al. ........ 166/250.01 |
| 6,803,744 B1 * | 10/2004 | Sabo ................... 320/108 |
| 6,870,475 B2 * | 3/2005 | Fitch et al. ............ 340/539.12 |
| 6,970,699 B1 | 11/2005 | Hagerty et al. |
| 7,471,986 B2 * | 12/2008 | Hatlestad ................ 607/61 |
| 7,521,890 B2 * | 4/2009 | Lee et al. ............... 320/108 |

* cited by examiner

*Primary Examiner*—Albert W Paladini
(74) *Attorney, Agent, or Firm*—James M. Kasischke; Michael P. Stanley; Jean-Paul A. Nasser

(57) ABSTRACT

Means and methods of remotely powering a plurality of sensor coils are described. The plurality of sensor coils can be inductively coupled to a single, primary coil so as to bias the active circuitry of the sensors. The primary and sensor coils can have a separation on the order of inches, such that the sensors can be mounted exterior to a vessel and the primary coil can be mounted interior to the vessel. In some embodiments, the primary coil can be a wire coil. In other embodiments, the primary coil can be a planar coil pattern etched onto a printed circuit board.

13 Claims, 4 Drawing Sheets

INDUCTIVE COUPLING METHOD FOR REMOTE POWERING OF SENSORS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

Not applicable.

BACKGROUND (1) Field of the Invention

The methods and systems described herein relate to remote powering of sensors, and more particularly to methods and systems for delivering power to a number of remote sensors utilizing inductive coupling between a planar primary coil and a plurality of sensor coils.

(2) Description of the Prior Art

Submarines and other vessels utilize large sensor arrays for detection of acoustic energy within the surrounding water. For proper sensing and detection, the arrays or grids of sensors are mounted on the external side of the hulls of the vessels. The sensors are embedded in an acoustic polymer material and are generally several inches above the hull. Current on-hull sensor arrays are powered from the interior of the vessel. Power connections to the inboard side of a vessel typically include large, heavy and expensive wiring harnesses.

The wiring harnesses can add significant weight to the vessel and each power connection from the harness to a sensor requires a penetration through the hull. The wiring harnesses and penetrations can add significantly to the costs of the vessel. Additionally, each penetration provides a source of possible leakage and may decrease the overall structural integrity of the hull.

What are therefore needed are methods and systems for delivering power to the sensors without the use of wired connections. Such methods and systems may save significant amounts of weight and costs in overall acoustic detection array systems by reducing or removing large, heavy cable harnesses currently used to deliver power to the outboard sensors.

Reliability may also be improved by not requiring a physical connection through the hull in order for a sensor to receive power.

One such method would involve the use of coils and inductive coupling to power sensors. In the prior art there are examples of the use of this technology on a very limited scale. U.S. Pat. No. 6,535,133 to Gohara et al, for "Vehicle slide door power supply apparatus and method of supplying power to vehicle slide door" (issued Mar. 18, 2003) teaches a power supply apparatus for supplying electric power from a vehicle body to a slide door slidable mounted on the vehicle body of a vehicle, the power supply apparatus comprising a primary coil provided to the vehicle body; a secondary coil provided to the slide door, wherein the primary and secondary coils can be brought into proximity to each other upon closing of the slide door to effect a mutual induction operation so as to supply the electric power; a temperature sensor provided in a vicinity of the primary coil; a primary coil control device which is connected to the temperature sensor, and stops excitation of the primary coil in accordance with the temperature of the primary coil or the vicinity of the primary coil detected by the temperature sensor, so as to interrupt a supply of the electric power to the slide door; a slide door-contained battery for supplying electric power to a load driver driving and controlling at least one load on the slide door at least when the slide door is opened or when the supply of the electric power to the slide door is interrupted; and charging means for charging the slide door-contained battery with the electric power supplied to the slide door through the secondary coil.

U.S. Pat. No. 6,535,133 is a very relevant example of prior art in that it discloses a method for using two very closely spaced coils of approximately equal size for power delivery over the short gap that exists in a closed automotive sliding door. The invention requires the two coils to be very close together in order to operate. In addition, it is merely a one-to-one power delivery method and is used to keep a door-mounted battery charged.

What is needed is an inductive coupling method on a much larger scale that can employ a single large planar primary coil inductively coupling electrical energy to a number of smaller co-planar sensor coils above it, where the distance between the plane of the primary coil and the plane of the sensor coils remains constant.

SUMMARY OF THE INVENTION

It is a general purpose and object to provide methods and means of delivering power to a number of remote sensors that do not require a physical connection between the source of power and the sensors. A further object is to reduce costs and weight by replacing large, heavy, cable harnesses currently used for delivering power. A still further object is to improve reliability and structural integrity by eliminating through-hull physical connections for on-hull sensor grids.

These objects are accomplished by providing means and methods utilizing inductive coupling between a powered primary coil and a plurality of sensor coils to bias the active circuitry of the sensors. In some embodiments, the primary coil may be a wire coil. In other embodiments, the primary coil may be a planar coil pattern etched onto a printed circuit board.

In one embodiment, a system for remotely powering sensors includes a primary coil connected to a power source, a plurality of sensor coils spaced apart from the primary coil, and sensor circuitry at each one of the plurality of sensor coils, which together with the sensor coil form a sensor unit, wherein a current in the primary coil inductively couples to the plurality of sensor coils to induce a corresponding current in each one of the plurality of sensor coils such that the current activates the sensor circuitry to power each sensor unit.

The primary coil is adapted for mounting on the exterior side of a closed vessel hull as are the sensor coils. The primary coil must be on the same side of the hull as the sensors. Otherwise, the hull will shield the sensor coils from the magnetic field produced y the primary soil. The primary coil must not be in contact with the hull. The sensor units may be disposed between a first acoustic layer exteriorly adjacent the vessel hull and a second acoustic layer disposed exteriorly to the first acoustic layer. The first acoustic layer is referred to as the inner layer and is bonded to the hull with a polymer adhesive. The second acoustic layer is referred to as the outer layer and is bonded to the inner layer. The primary coil and/or the sensor coils can be formed of a planar coil of wire, or may be etched onto a printed circuit board. The separation between the primary coil and the sensor coils may be as much as several inches. There is no minimum spacing requirement.

In one aspect, the method includes forming the primary coil and/or the sensor coils from a coil of wire, or etching at least one of the primary coil and the sensor coils unto a printed circuit board.

BRIEF DESCRIPTION OF THE DRAWINGS

A more complete understanding of the methods and systems and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
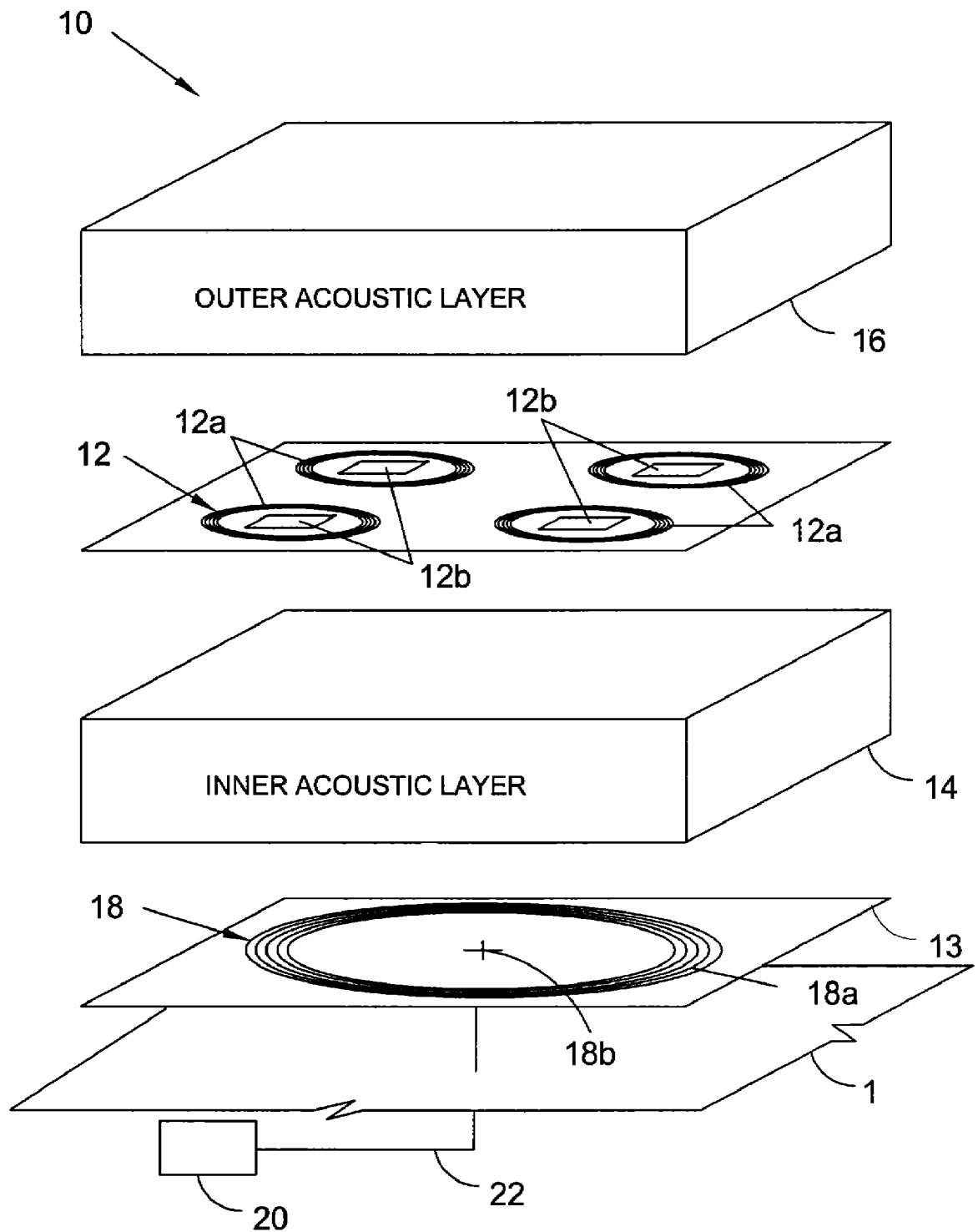
FIG. 1 shows a schematic diagram of a remote powering system.

Referring to FIG. 1, there is shown a schematic diagram of a system 10 for remote powering of sensors 12. For purposes of illustration and without limitation, system 10 is described herein with relation to remote sensors mounted on an exterior surface of a closed vessel hull 1. However, it can be understood that system 10 can be applicable to other configurations where multiple sensors are to be powered without having a direct power connection thereto. For the embodiment shown in FIG. 1, sensors 12 are embedded between two layers (14, 16) of acoustic polymer material, denoted as the inner layer 14 and outer layers 16. The inner acoustic polymer layer 14 is bonded to the hull with a bonding layer of adhesive 13 disposed over the exterior of the closed vessel hull 1. Each of the sensors 12 includes a pickup coil 12a consisting of a number of turns of wire and sensor circuitry 12b electrically connected to pickup coil 12a. Each of the sensors 12 are coplanar in a single plane that serves as an isolated sensing layer of a multi-sensor arrangement.

Planar power coil 18 consists of a number of turns of wire 18a. The plane of planar power coil 18 is parallel to the plane of the sensors 12. In a preferred embodiment, planar power coil 18 is larger than the pickup coils 12a by at least a 5:1 ratio of diameter, but the invention is not limited to such a ration as such. Planar power coil 18 is a fixed distance from the pick up coils 12a on an order of several inches. Power source 20 provides power to power coil 18 through connecting wires 22. For purposes of illustration, in keeping with the exemplary closed vessel hull configuration and without limitation, the primary power coil 18 is adapted for mounting on the exterior side of a closed vessel hull. The power coil 18 must be on the same side of the hull as the sensors 12.

Otherwise, the hull will shield the sensor coils 12a from the magnetic field produced y the power coil 18. The power coil 18 must not be in electrical contact with the hull and is preferably located between the inner layer 14 and the hull. The connecting wires 22 carry an AC current at a frequency somewhere in the range of 100-500 kHz from power source 20 to power coil 18. The system 10 operates in a continuous wave mode.

As is known in the art, running a current of electricity in a wire coil such as power coil 18 produces a magnetic field that, near the center 18b of the power coil 18, is normal to the plane of power coil 18. The magnetic field induces an AC current to flow in each of the pickup coils 12a that are present at each sensor 12 location. The AC current is then rectified using standard circuit components of sensor circuitry 12b, e.g., diodes, capacitors and the like, and is made available as DC power for sensor 12 to operate.

Figure 2:
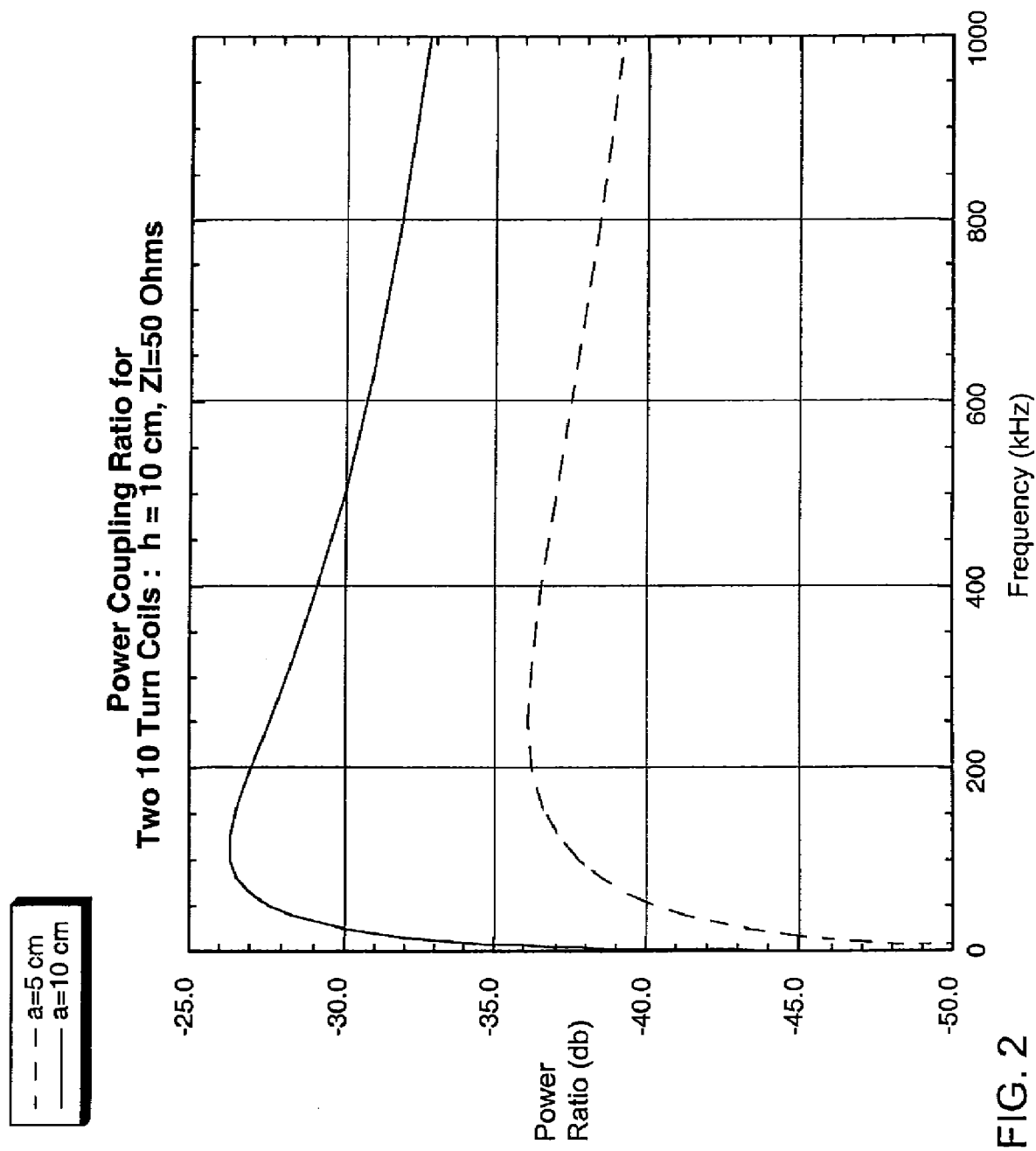
FIG. 2 shows a plot of system performance for equally sized coils.

FIG. 2 is a graph of calculations performed to determine the performance of such a system for the simple case of equally sized pickup and power coils. As illustrated thereon, a reasonable amount of power transfer can be realized. In FIG. 2, the power transfer ratio is shown in decibels for two example coil diameters, a. For the case shown in FIG. 2, the calculations were performed using #22 AWG wire for power coil 18 and pickup coil 12a.

One key parameter to be considered using inductive coupling is the mutual inductance between the feed or power coil 18 and pickup coils 12a. As a starting point, consider two identical circular filamentary coils of N turns each, one located in the z=0 plane, the other in the z=h plane, i.e., the coils lie in two parallel planes a distance h apart. The mutual inductance between two arbitrary current-carrying bodies can be found from equation [1]:

$$M = \frac{\mu_0}{4\pi} \int_V \int_{V'} \frac{\hat{f}_1 \cdot \hat{f}_2}{r} dV dV', \quad [1]$$

where $\mu_0$ is the permeability of free space;

the $\hat{f}$ terms are unit vectors at each increment of volume dV indicating direction of current flow; and r is the radius of the coil.

The volumetric double integral is evaluated over the two coils carrying current. For the filamentary coils under consideration, this integral reduces to a double closed line integral:

$$M = \frac{\mu_0}{4\pi} \oint_{C1} \oint_{C2} \frac{\hat{\phi} \cdot \hat{\phi}'}{r} dl dl' \quad [2]$$

The unit vectors and the distance between differential elements are evaluated to obtain:

$$M = \frac{\mu_0 a^2}{4\pi} \int_0^{2\pi} \int_0^{2\pi} \frac{\cos(\phi - \phi')}{\sqrt{2a^2[1 - \cos(\phi - \phi')] + h^2}} d\phi d\phi' \quad [3]$$

Normalizing the coil radius by the spacing and defining a parameter $\alpha$ such that $h = \alpha a$, equation [3] can be rewritten as:

$$M = \frac{\mu_0 a}{4\pi} \int_0^{2\pi} \int_0^{2\pi} \frac{\cos(\phi - \phi')}{\sqrt{(\alpha^2 + 2) - 2\cos(\phi - \phi')}} d\phi d\phi' = \frac{\mu_0 a}{4\pi} I(\alpha), \quad [4]$$

where I is the current.

For coils of N turns each, the above equation is multiplied by N twice—once for each coil—to obtain the final expression for mutual inductance:

$$M = \frac{\mu_0 a N^2}{4\pi} I(\alpha) \quad [5]$$

The self-inductance for a filamentary loop cannot be found by this method—the integral yields an infinite result. For a reasonable approximation, it can be assumed that the coils are #22 AWG having a radius of b=0.64 mm and the known expression for self-inductance can be used:

$$L = \mu_0 a \left( \ln \frac{8a}{b} - \frac{3}{2} \right) \quad [6]$$

To estimate the efficiency of the coupling, circuit theory for transformers can be employed using:

$$\frac{P_{out}}{P_{in}} = \left( \frac{j\omega M}{Z_L + j\omega L} \right)\left( \frac{j\omega M Z_L}{j\omega L(Z_L + j\omega L) + \omega^2 M^2} \right), \quad [7]$$

where P is power;
Z is impedance; and
ω is the angular frequency.

The first term in parenthesis is the current ratio and the second term is the voltage ratio for a given load impedance $Z_L$. For an example case, consider h=4"=10.16 cm, N=10, and a=5 cm. The mutual and self inductances are plotted in FIG. 3.

Figure 3:
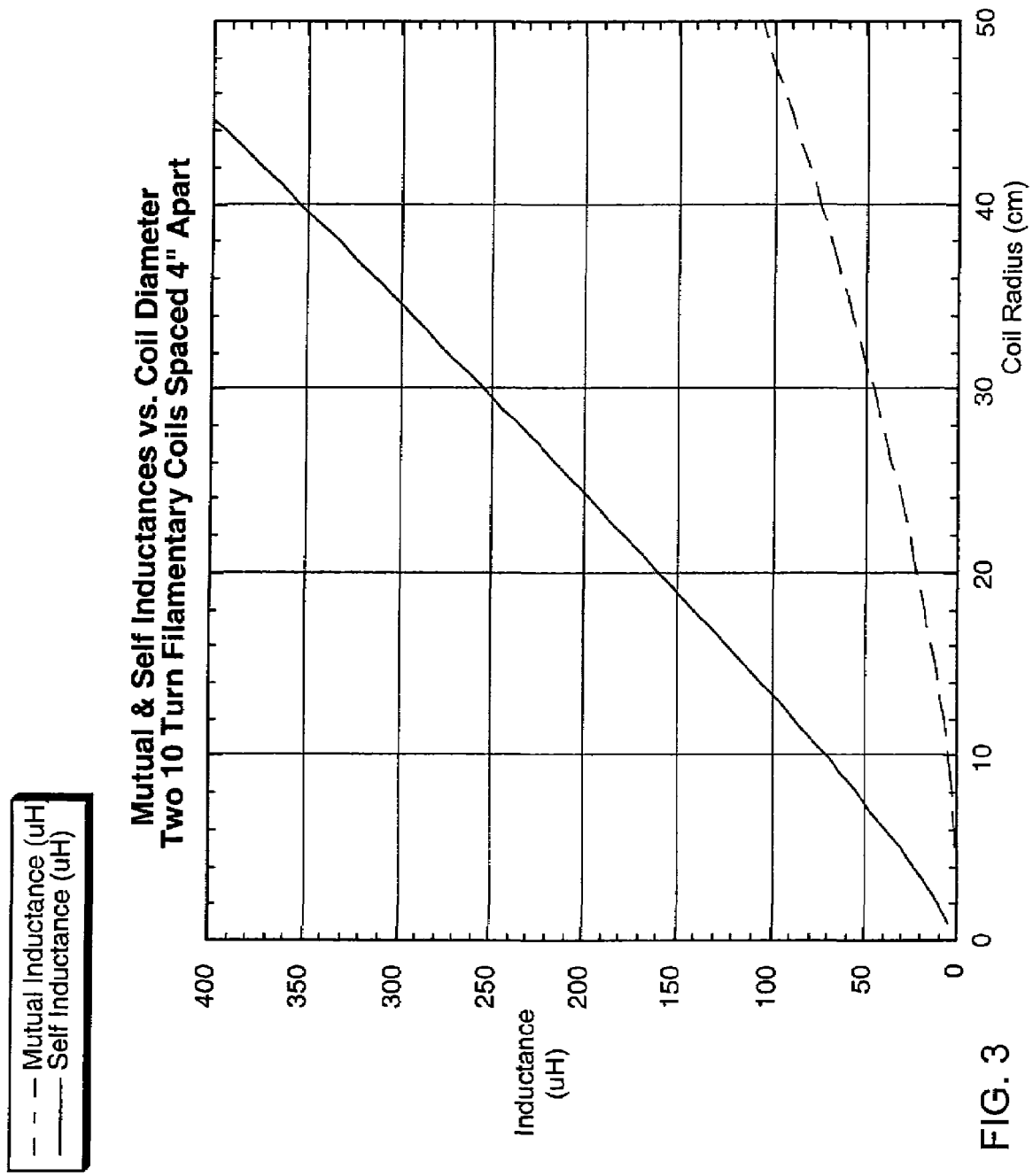
FIG. 3 shows a plot of mutual and self inductance for equally sized coils.

As illustrated in FIG. 3, the self inductance is noticeably higher than the mutual, due to the large separation of the coils. Referring back to FIG. 2, there is a graph of the power coupling factor for a=5 cm and a=10 cm for an arbitrary load impedance of 50 Ohms. For this case, the optimum frequency of operation is around 100 kHz for the 10 cm coil and just shy of 300 kHz for the 5 cm one. As expected, the larger coil gives a better result. In this example, a coupling factor of around −26 dB is achieved—meaning that 1 Watt of power input will yield around 50 mW delivered to the load.

The number of sensors that can be powered in this manner depends on the size of the power coil used and the sensor spacing. The larger the power coil is and the more turns it has, the more sensors that can be powered. In order to determine if the use of coils of unequal size will be beneficial in improving the coupling efficiency between the two coils, the mutual inductance must be re-derived in order to allow for differing radii.

For two N-turn parallel coaxial coils of radii a and b, respectively, the mutual inductance is given by:

$$M = \frac{\mu_0 a b N^2}{4\pi} \oint_{C1} \oint_{C2} \frac{\hat{\phi} \cdot \hat{\phi}'}{R} dl \, dl', \quad [8]$$

where R is the distance between incremental segments on each coil and is given by;

$$R = \sqrt{a^2 + b^2 + h^2 - 2ab\cos(\phi - \phi')}, \quad [9]$$

If, as before, the spacing h is normalized by the lower coil radius, a, and the upper coil radius, b, is normalized such that h=αa and b=βb, equation [9] can be written as:

$$R = a\sqrt{1 + \alpha^2 + \beta^2 - 2\beta\cos(\phi - \phi')} \quad [10]$$

and the mutual inductance becomes:

$$M = \frac{\mu_0 a N^2}{4\pi} \int_0^{2\pi} \int_0^{2\pi} \frac{\cos(\phi - \phi')}{\sqrt{1 + \alpha^2 + \beta^2 - 2\beta\cos(\phi - \phi')}} d\phi \, d\phi' = \quad [11]$$

$$\frac{\mu_0 a N^2}{4\pi} I(\alpha, \beta)$$

To illustrate whether or not the mutual inductance can be improved, consider the example of a bottom side coil with N=10 and a=3 in. For h=4 inches, i.e., α=4/3, a plot of M vs. b can be formed as illustrated in FIG. 4.

Figure 4:
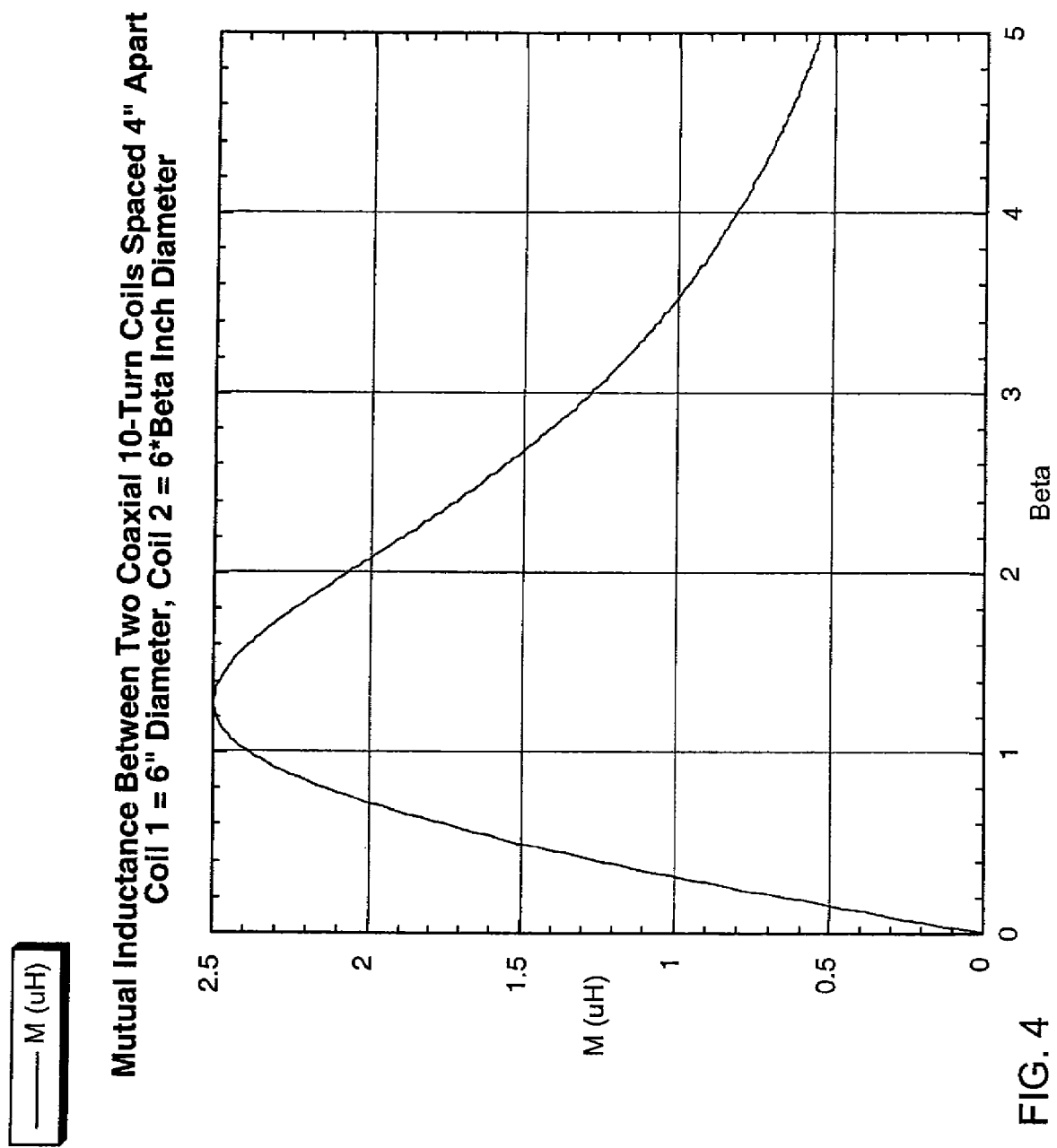
FIG. 4 shows a plot of mutual inductance for two coils of different sizes.

It is clear from the plot in FIG. 4 that there is not much more mutual inductance to be gained by using differing coil sizes in this instance. The mutual inductance increases from 2.38 µH when β=1, the case of equal coil sizes, to 2.50 µH when β=1.28. This represents an increase of only 4.8%.

However, despite this modest increase, the systems and methods described herein provide advantages over existing systems for powering sensors. The use of inductive coupling provides power to the sensors without a physical connection to the sensors. Accordingly, wiring requirements for the sensors are reduced and/or eliminated. Additionally, in the case of a vessel where the sensors are on the exterior of the hull, penetrations through the hull are not required, resulting in increased structural integrity of the hull and decreased risk of leakage. Further, the inductive coupling system described herein uses a single large coil to provide power to a plurality of sensors. The use of a large coil provides for increased separation between the power coil and the sensor coils.

What has thus been described is a system for remotely powering a plurality of sensor coils by inductively coupling the sensor coils to a single, primary coil so as to bias the active circuitry of the sensors. The primary and sensor coils can have a separation on the order of inches, embedded in the acoustic layers or at their interfaces.

Obviously, many modifications and variations of the present invention may become apparent in light of the above teachings. For example, the system can be configured to suit not only applications in vessels, as described herein, but may be adapted for operation in land and air vehicles, or other applications requiring remote sensor powering. Further, the primary coil and sensor coils may be fabricated as wire coils or may be a planar coil pattern etched onto a printed circuit board, or some combination of wire and printed circuit board.

In light of the above, it is therefore understood that within the scope of the appended claims, the invention may be practiced otherwise than as specifically described.

What is claimed is:

1. A system for remotely powering a plurality of electrically powered sensors, comprising:
    a primary coil connected to a power source wherein the primary coil is adapted for mounting exterior to a closed vessel hull having an interior and an exterior, the power source generates an electrical alternating current in a frequency range of 100 to 500 kHz in said primary coil in a continuous wave mode, the plurality of sensor coils is adapted for mounting exterior to the vessel hull; and
    a plurality of electrically powered sensors having internal electronic circuitry, wherein said plurality of electrically powered sensors is spaced apart from the primary coil at a fixed distance, wherein each individual sensor's electronic circuitry is joined to an individual sensor coil wherein a current in the primary coil inductively couples to the plurality of sensor coils to induce a corresponding current in each one of the plurality of sensor coils, the corresponding current activating the internal electronic circuitry of each of said plurality of electrically powered sensors, thereby powering said plurality of electrically powered sensors.

2. The system of claim 1 wherein each of said plurality of electrically powered sensors further comprise a rectifying circuit joined to said sensor coil to rectify the induced alternating current from said sensor coil to a direct current.

3. The system of claim 1, comprising:
a bonding layer of adhesive disposed over the exterior of said closed vessel hull;
a first acoustic layer exteriorly adjacent to the bonding layer of adhesive, wherein said bonding layer of adhesive serves to bond the first acoustic layer to the exterior of the hull, wherein the primary coil is disposed between the bonding layer of adhesive and the first acoustic layer; and
a second acoustic layer disposed exteriorly to the first acoustic layer, the sensor units being disposed between the first acoustic layer and the second acoustic layer in a coplanar arrangement creating an isolated sensing layer of a multi-layer arrangement, wherein the dimensional plane of said isolated sensing layer is parallel to the plane of said primary coil.

4. The system of claim 1, wherein at least one of the primary coil and the sensor coils comprises a planar coil of wire and wherein the primary coil has a larger diameter than the plurality of sensor coils.

5. The system of claim 4, wherein at least one of the primary coil and the sensor coils comprise a planar coil pattern etched onto a printed circuit board.

6. The system of claim 1, wherein at least one of the primary coil and the sensor coils comprise a planar coil pattern etched onto a printed circuit board.

7. The system of claim 1, wherein a separation between the primary coil and the sensor coils is as much as several inches.

8. The system of claim 1, wherein at least one of the primary coil and the sensor coils comprises a planar coil of wire.

9. The system of claim 8, wherein at least one of the primary coil and the sensor coils comprise a planar coil pattern etched onto a printed circuit board.

10. The system of claim 1, wherein at least one of the primary coil and the sensor coils comprise a planar coil pattern etched onto a printed circuit board.

11. A method for delivering electric power through acoustic polymers, comprising:
positioning a primary coil exterior to a hull wall of a closed vessel;
positioning a plurality of sensors in a coplanar arrangement, each of which has a sensor coil, exterior to the hull wall between an inner layer of acoustic polymers and an outer layer of acoustic polymers, the primary coil and sensor coils disposed in parallel planes at a fixed distance;
passing an alternating electric current through the primary coil in a frequency range of 100 to 500kHz in a continuous wave mode, thereby producing a magnetic field normal to the primary coil;
inductively coupling the plurality of sensor coils to the primary coils to produce alternating currents therein; and
rectifying the alternating currents in the sensor coils to direct currents.

12. The method of claim 11, further comprising forming at least one of the primary coil and the plurality of sensor coils from a coil of wire.

13. The method of claim 12, further comprising etching at least one of the primary coil and the plurality of sensor coils unto a printed circuit board.

* * * * *